United States Patent Office 3,019,468
Patented Feb. 6, 1962

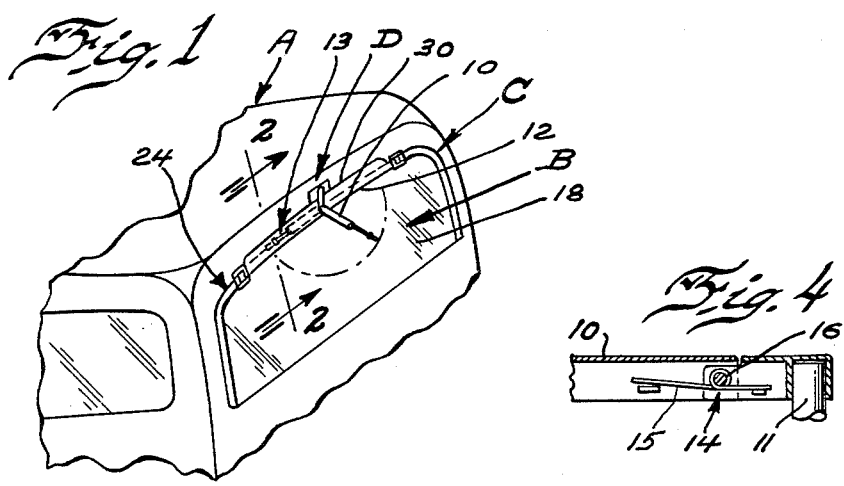
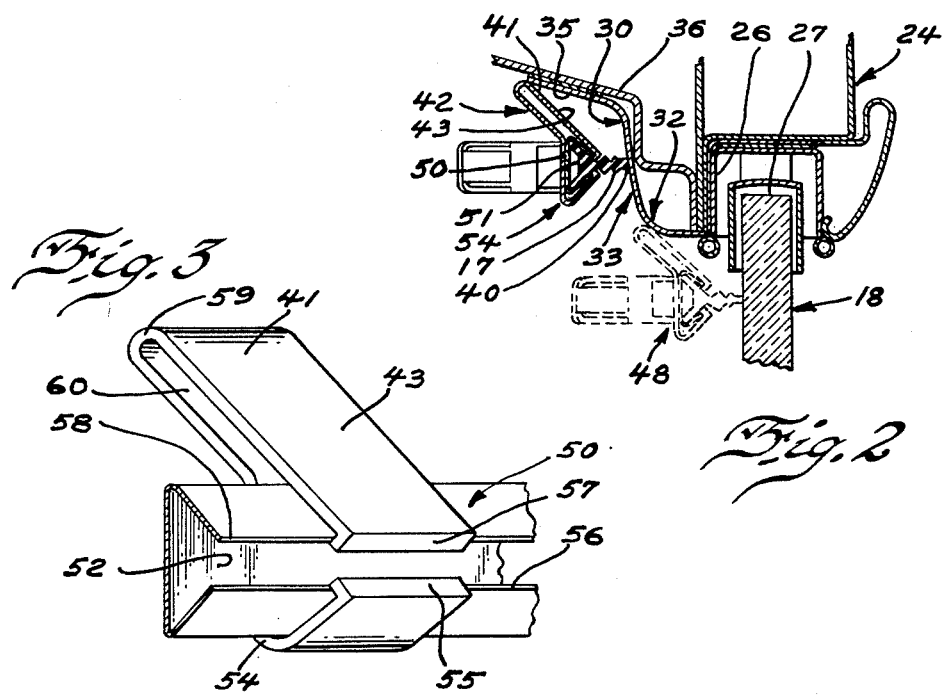
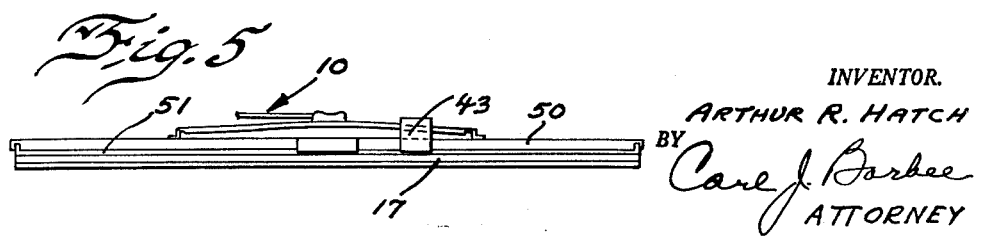

3,019,468
WIPER BLADE PARKING DEVICE
Arthur R. Hatch, Plymouth, Mich., assignor to American Motors Corporation, Kenosha, Wis., a corporation of Maryland
Filed Sept. 19, 1960, Ser. No. 56,882
4 Claims. (Cl. 15—250.19)

The invention relates to a window cleaning device having means for off-the-window parking.

In the conventional window cleaning device for automotive vehicles, the wiping blade is detachably connected to an arm which is carried by an oscillating shaft, a spring connection between the arm and shaft serving to urge the arm toward the window surface thereby maintaining wiping pressure of the blade upon the window. When the blade is in park position, the pressure condition on the arm still exists.

If the window is of the type which may be raised or lowered with reference to its frame, then it is necessary to park the window cleaning device in a position where it is out of contact with the window.

The principal object of the invention, then, is to provide a simple and inexpensive device for off-the-window parking of the wiping blade.

A specific object is to provide an inexpensive clip device for attachment to the backing member of the wiping blade assembly for facilitating the parking operation.

Other objects and advantages of the invention will be apparent from the ensuing specification and appended drawing in which:

FIG. 1 is a perspective view of the window cleaning device as mounted at the rear window of an automotive vehicle.

FIG. 2 is a fragmetary sectional view taken generally on the line 2—2 of FIG. 1.

FIG. 3 is an enlarged perspective view of the clip attached to the backing member, the flexible wiping blade being removed.

FIG. 4 is a fragmentary sectional detail view of a conventional wiper arm showing a portion of the drive shaft.

FIG. 5 is a side elevational view of a conventional wiper blade assembly with the parking device secured thereto.

In FIG. 1 I have shown a portion of the back end of an automotive vehicle A having a rear window B mounted in the frame portion C. The window cleaning device, identified generally by the letter D, is mounted on the header portion of the window frame.

The window cleaning device includes the conventional wiper arm 10 which is connected to a power driven shaft 11. The shaft oscillates throughout a pre-determined arc during the window cleaning operation and travels an additional pre-determined distance beyond the normal cleaning arc when being parked. Referring to FIG. 1, when the wiper blade is oscillating, it will describe an arc in which the blade reverses movement before reaching molding 12 at either end of the arc. When the power for oscillating the blade is turned off, the shaft 11 will automatically rotate an added pre-determined distance to move the blade assembly to parking position wherein the blade comes to a stop in the position shown in dotted lines at 13 in FIG. 1. The mechanism, by which the additional rotative movement of the drive shaft for parking purposes is accomplished, is conventional and hence is not shown.

The wiper carrying arm 10 is articulated at 14 and a spring 15 continuously urges the arm about the axis of pin 16 whereby the wiper blade 17 has biased contact with the window B at all times during oscillation of the wiper carrying arm. The lateral bias exerted on the wiper carrying arm, of course, continues during the parking operation.

The window frame C has a header portion 24 providing a channel member 26 into which the upper end 27 of the window enters when the window is fully raised. When the window is lowered, there would be no bearing surface for the wiper blade to rest on and, consequently, it must be parked somewhere on the window frame. A molding strip 30 is mounted so as to extend longitudinally of the header structure and it serves as a parking area for the wiper blade. Considering the cross sectional contour of the molding strip, it has a curved surface 32 and a generally flat parking surface 33 contiguous to the curved surface. The upper longitudinal edge 35 may be bent with reference to the parking surface in order to follow the cross sectional contour of the vehicle body panel 36.

The wiper blade assembly includes a backing member 50 having a cross sectional configuration as best shown in FIG. 3. The backing member is formed of a generally rigid material, such as metal, however, it is capable of longitudinal flexure for following a curved window surface, if necessary. The wiper blade 17 is formed of a resilient material, such as rubber, and has a longitudinally extending base portion 51 which is received within the channel area 52 provided by the backing member.

The parking clip 42 has a rear portion 54 which is generally looped around the contour of the backing member 50 and an inwardly turned flange 55 overhangs the longitudinal edge 56 of the backing member. A second flange 57 overhangs the other longitudinal edge 58 of the backing member and the elongated ramp portion 43 of the clip terminates with a loop 59 which continues with the return tongue 60. Thus the parking clip may be formed of a single strip of a generally resilient material, such as metal, to provide the necessary gripping tension at each of the flange ends of the clip. Thus the clip can be readily mounted on the backing member by temporarily prying apart the flange ends of the clip to permit the mounting thereof onto the backing member and for holding the clip in a fixed position on the backing member.

When the wiper arm is being oscillated for window cleaning purposes, the cleaning edge 40 of the wiper blade is pressed against the window surface under the influence of spring 15. When the window cleaning operation is completed and the power is turned off, the shaft 11 will continue to swing the wiper blade assembly toward parking position. The upper end 41 of the clip 42 engages the curved surface 32 of the molding clip. Continued oscillation of the wiper blade assembly will cause the ramp portion 43 of the clip to ride over the curved surface of the molding strip thereby lifting the wiper blade off of the window surface. In fully parked position, the wiper blade 17 will be resting on the parking area 33 of the molding strip as shown in FIG. 2. The commencement of the parking operation is indicated in dotted lines at 48 in FIG. 2.

I claim:
1. In combination with a vehicle having a header structure with a channel area for receiving the marginal edge of a window pane, apparatus for contacting the pane for cleaning same and for parking out of contact with the pane when inoperative, said apparatus comprising a longitudinal molding strip extending along the header adjacent the marginal edge of the pane, said strip being curved in cross section; an actuating arm mounted on the header structure for swinging movement relative thereto; a wiper blade assembly carried on the arm and including a resilient wiper blade for contacting the window pane and a backing member spaced from the window pane and carrying the wiper blade; means for elevating the wiper blade out of contact with the pane and for assisting in effecting movement of the wiper blade to a position overlying the molding strip during swinging movement of the arm to parking position, said means including, a clip secured to the backing member and spaced from the window pane, said clip being of a width several times less than the length of the wiper blade and several times less than the length of the backing member and said clip having a ramp portion for engaging the molding strip to initiate elevating the wiper blade out of contact with the pane during swinging movement of the arm to parking position.

2. Apparatus as set forth in claim 1 wherein the clip is formed from a strip of resilient material having a loop portion embracing a portion of the backing member and an extension bent back to form a tine having a free end engaging the backing member, the outer face of the tine providing the ramp.

3. Apparatus as set forth in claim 1 wherein the clip includes a portion removably secured to the backing member and the ramp portion is inclined rearwardly with reference to the portion secured to the backing member.

4. Apparatus as set forth in claim 3 wherein the portion secured to the backing member terminates with spaced free ends permitting temporary expansion for installation purposes.

References Cited in the file of this patent

UNITED STATES PATENTS 1,937,160     Oishei _____ Nov. 28, 1933